US 11,060,557 B2

(12) United States Patent
Chen et al.

(10) Patent No.: US 11,060,557 B2
(45) Date of Patent: Jul. 13, 2021

(54) TELESCOPIC MECHANISM

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shun-Ho Yang, Kaohsiung (TW); Chun-Yi Ho, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/690,022

(22) Filed: Nov. 20, 2019

(65) Prior Publication Data
US 2021/0079952 A1   Mar. 18, 2021

(30) Foreign Application Priority Data
Sep. 12, 2019 (TW) .................. 108133324

(51) Int. Cl.
*F16C 29/02* (2006.01)
(52) U.S. Cl.
CPC .................. *F16C 29/02* (2013.01)
(58) Field of Classification Search
CPC .............................. H05K 7/1489; F16C 29/02
USPC .............................. 312/334.4, 334.5, 334.46
See application file for complete search history.

(56) References Cited

U.S. PATENT DOCUMENTS

| | | | |
|---|---|---|---|
| 1,969,749 A * | 8/1934 | Harsh | E05C 19/04 292/73 |
| 2,658,241 A * | 11/1953 | Houghton, Jr. | E04C 3/005 52/632 |
| 3,650,578 A | 3/1972 | Del Vecchio | |
| 6,659,577 B2 * | 12/2003 | Lauchner | H05K 7/1421 312/223.1 |
| 6,666,340 B2 * | 12/2003 | Basinger | H05K 7/1489 211/175 |
| 6,805,418 B2 * | 10/2004 | Milligan | A47B 88/49 312/333 |
| 6,980,430 B2 * | 12/2005 | Su | G06F 1/184 312/333 |
| 7,731,313 B2 * | 6/2010 | Chen | H04M 1/0237 312/334.45 |
| 8,028,965 B2 * | 10/2011 | Chen | A47B 88/493 248/298.1 |
| 8,733,866 B2 * | 5/2014 | Chen | A47B 88/40 312/334.4 |

(Continued)

FOREIGN PATENT DOCUMENTS

EP      2 764 796 A1   8/2014

*Primary Examiner* — Daniel J Troy
*Assistant Examiner* — Timothy M Ayres
(74) *Attorney, Agent, or Firm* — Winston Hsu

(57) ABSTRACT

A telescopic mechanism includes a first component and a second component. The second component is capable of moving relative to the first component along a longitudinal direction. One of the first component and the second component is arranged with a contacting portion. The contacting portion resiliently abuts against the other one of the first component and the second component, such that a friction resistance is provided when the second component is moved relative to the first component.

17 Claims, 7 Drawing Sheets

(56) References Cited

U.S. PATENT DOCUMENTS

| | | | |
|---|---|---|---|
| 9,560,786 B2* | 1/2017 | Chen | A47B 96/07 |
| 10,047,791 B2* | 8/2018 | Chen | F16C 29/02 |
| 10,092,100 B1 | 10/2018 | Chen | |
| 10,130,001 B2* | 11/2018 | Chen | H05K 7/183 |
| 2004/0119388 A1 | 6/2004 | Huang | |
| 2005/0088069 A1 | 4/2005 | Greenwald | |
| 2008/0246378 A1 | 10/2008 | Chen | |
| 2013/0058596 A1 | 3/2013 | Chen | |
| 2018/0140093 A1* | 5/2018 | Chen | A47B 88/493 |

* cited by examiner

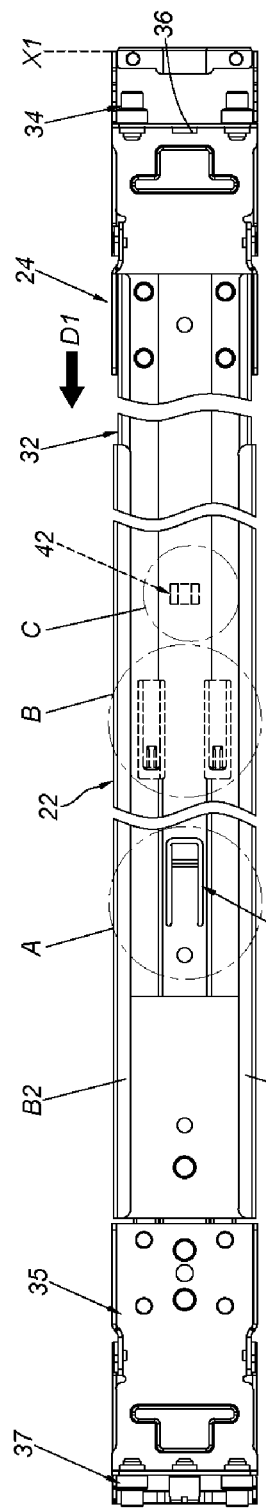
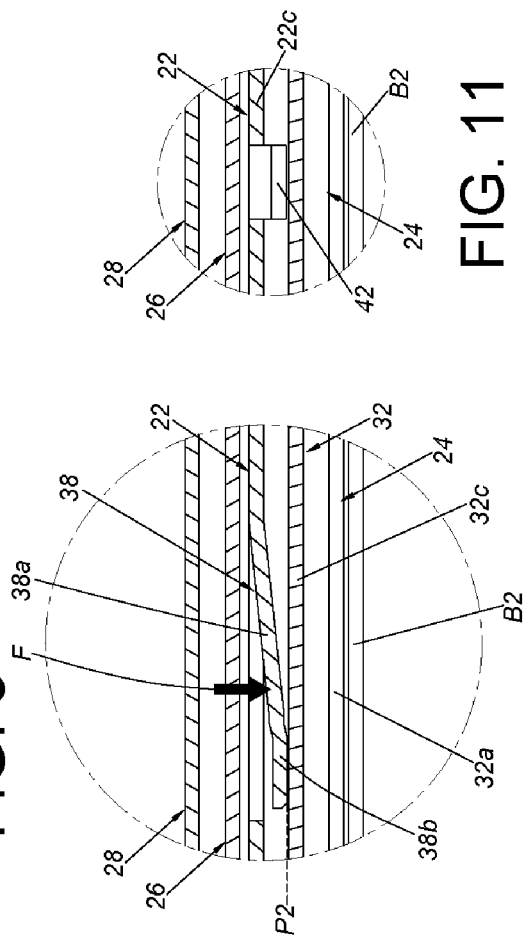
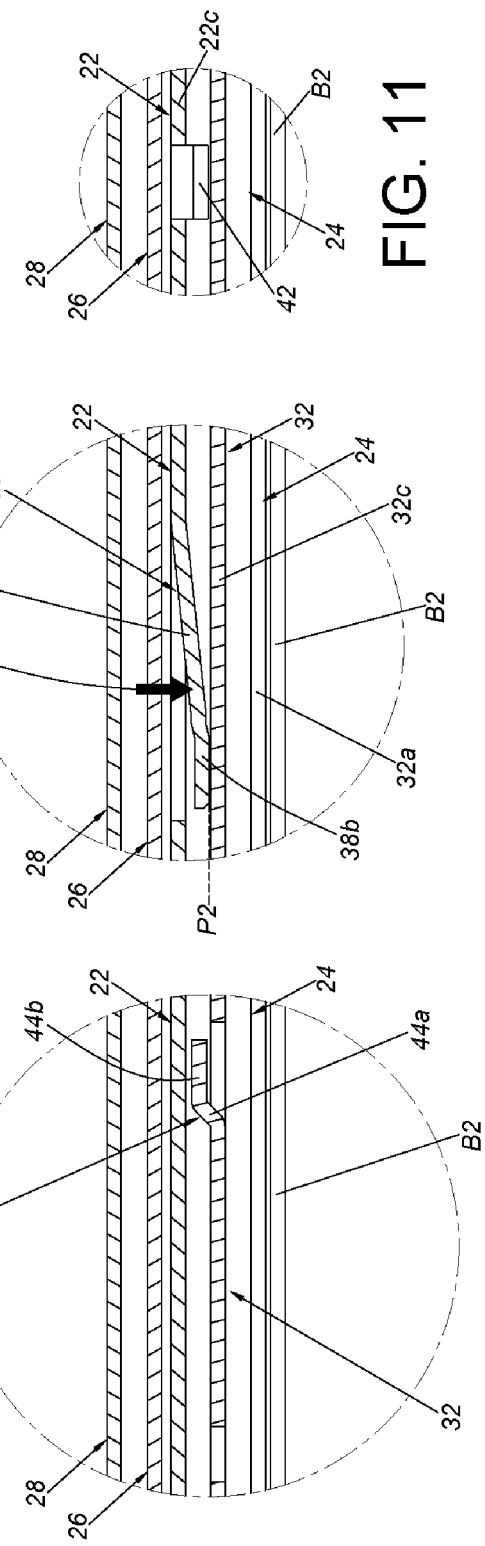
FIG. 8
FIG. 11
FIG. 10
FIG. 9

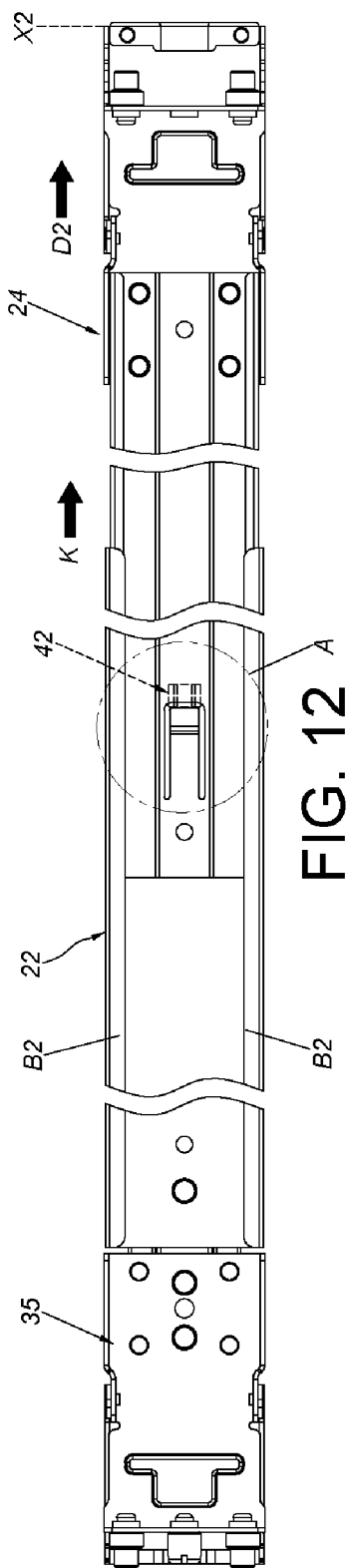
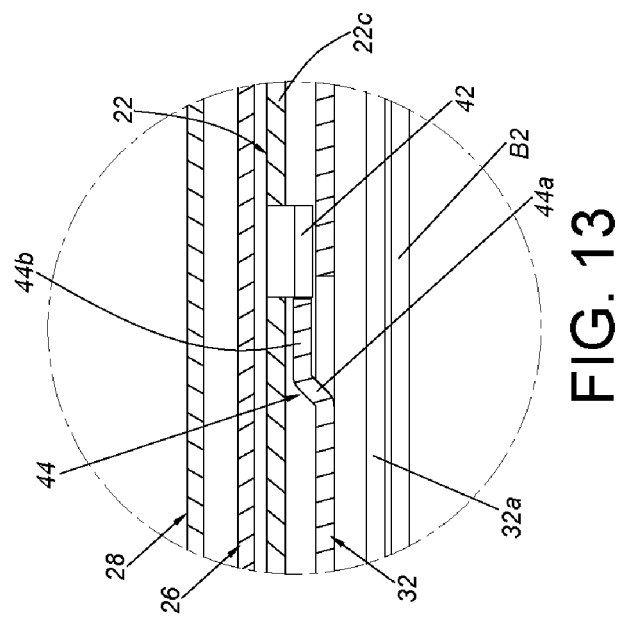

TELESCOPIC MECHANISM

BACKGROUND OF THE INVENTION

1. Field of the Invention

The present invention relates to a telescopic mechanism, and more particularly, to a telescopic mechanism having non-slip function.

2. Description of the Prior Art

As shown in the US patent with U.S. Pat. No. 8,028,965 B2, an adjustable bracket for a slide assembly is disclosed. The adjustable bracket includes the slide assembly, a fixing base and a sliding member. The fixing base is connected to a side of the slide assembly. The sliding member is mounted in a channel of the fixing base, such that the sliding member is capable of moving relative to the fixing base along a longitudinal direction.

Amounting tolerance may exist between the sliding member and the fixing base, for example, the size of the channel of the fixing base may be slightly greater than the size of the sliding member, which could lead the sliding member to slide arbitrarily in the channel of the fixing base. In this case, if a user picks up the adjustable bracket in an inclined manner (i.e., the orientation at which the user picks up the adjustable bracket is not horizontal), the sliding member may telescopically move relative to the fixing base. As such, the sliding member may unexpectedly protrude from the fixing base and hit people or objects around the adjustable bracket.

Thus, development of a reliable telescopic product becomes an important issue in the industry.

SUMMARY OF THE INVENTION

According to one aspect of the present invention, a telescopic mechanism includes a first component and a second component. The second component is capable of moving relative to the first component along a longitudinal direction. one of the first component and the second component is arranged with a contacting portion. The contacting portion resiliently abuts against the other one of the first component and the second component, such that a friction resistance is provided when the second component is moved relative to the first component.

Preferably, the first component is a reinforcement frame. The reinforcement frame includes a first wall, a second wall and a longitudinal wall connected between the first wall and the second wall. A passage is defined by the first wall, the second wall and the longitudinal wall. The second component is a bracket. The bracket includes an extending wall and at least one mounting element. The extending wall of the bracket is mounted in the passage of the reinforcement frame, and the at least one mounting element of the bracket is located outside the passage of the reinforcement frame.

Preferably, the at least one mounting element is arranged at an end portion adjacent to the extending wall.

Preferably, one of the first wall and the second wall of the reinforcement frame has a first section and a second section. The second section is bent relative to the first section. The extending wall of the bracket includes a first portion, a second portion and an extending portion connected between the first portion and the second portion. The extending portion of the extending wall of the bracket is abutted against the contacting portion. The second section of the one of the first wall and the second wall supports one of the first portion and the second portion of the extending wall of the bracket.

Preferably, the telescopic mechanism further includes a rail member. The rail member has a first side and a second side opposite to the first side. The reinforcement frame is connected to the first side of the rail member. The telescopic mechanism further includes a movable rail arranged on the second side of the rail member. The movable rail is capable of moving relative to the rail member along the longitudinal direction.

Preferably, the telescopic mechanism further includes another bracket. The bracket and the another bracket are respectively arranged adjacent to a first end portion and a second end portion of the rail member.

Preferably, the contacting portion is arranged in the passage of the reinforcement frame.

Preferably, the contacting portion includes an elastic section and a contacting section. The elastic section has a first end and a second end. The first end is connected to one of the first wall, the second wall and the longitudinal wall of the reinforcement frame. The contacting section is located between the first end and the second end. The contacting section is configured to abut the bracket.

Preferably, the first end of the elastic section of the contacting portion is connected to the longitudinal wall of the reinforcement frame. A height is defined between the contacting section of the contacting portion and the longitudinal wall of the reinforcement frame.

Preferably, the first component is arranged with a first limiting feature. The second component is arranged with a second limiting feature. The first limiting feature and the second limiting feature are cooperated with each other.

Preferably, the friction resistance is provided to stop the second component from moving relative to the first component along a first direction or a second direction opposite to the first direction.

Preferably, when a force greater than the friction resistance is applied to the second component, the second component is allowed to move relative to the first component from a position along the first direction or the second direction opposite to the first direction.

According to another aspect of the present invention, a telescopic mechanism includes a first component and a second component. The second component is telescopically connected to the first component. One of the first component and the second component is arranged with a contacting portion. The contacting portion resiliently abuts against the other one of the first component and the second component.

According to yet another aspect of the present invention, a telescopic mechanism includes a reinforcement frame and a bracket. The reinforcement frame includes a first wall, a second wall and a longitudinal wall connected between the first wall and the second wall. A passage is defined by the first wall, the second wall and the longitudinal wall. The bracket is detachably mounted to the reinforcement frame. The bracket includes an extending wall and at least one mounting element. One of the reinforcement frame and the bracket is arranged with a contacting portion. During a process of mounting the extending wall of the bracket in the passage of the reinforcement frame along a first direction, the contacting portion is capable of abutting the other one of the reinforcement frame and the bracket through an elastic section so as to generate a friction resistance. When the extending wall of the bracket is mounted in the passage of the reinforcement frame, the at least one mounting element is located outside the passage of the reinforcement frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a diagram showing the second component of the telescopic mechanism mounted to the first component of the telescopic mechanism and the second component is at a first position relative to the first component according to the embodiment of the present invention.

FIG. 9 is an enlarged cross-sectional view of a region A of FIG. 8.

FIG. 10 is an enlarged cross-sectional view of a region B of FIG. 8.

FIG. 11 is an enlarged cross-sectional view of a region C of

FIG. 8.

FIG. 12 is a diagram showing the second component of the telescopic mechanism mounted to the first component of the telescopic mechanism and the second component is moved relative to the first component along the second direction to a second position according to the embodiment of the present invention.

FIG. 13 is an enlarged cross-sectional view of a region A of FIG. 12.

DETAILED DESCRIPTION

Figure 1:
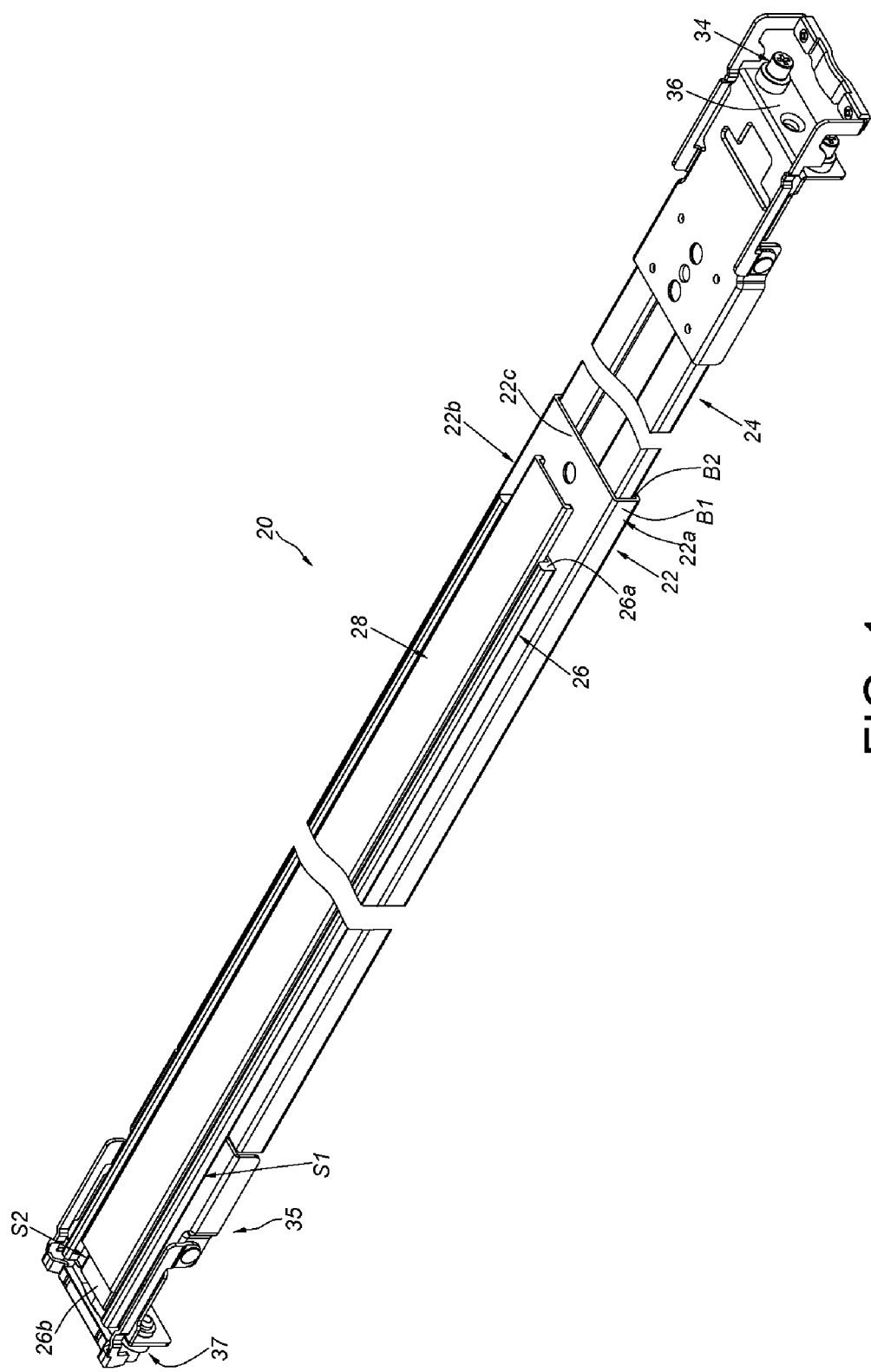
FIG. 1 is a three-dimensional diagram showing a telescopic mechanism according to an embodiment of the present invention.
Figure 2:
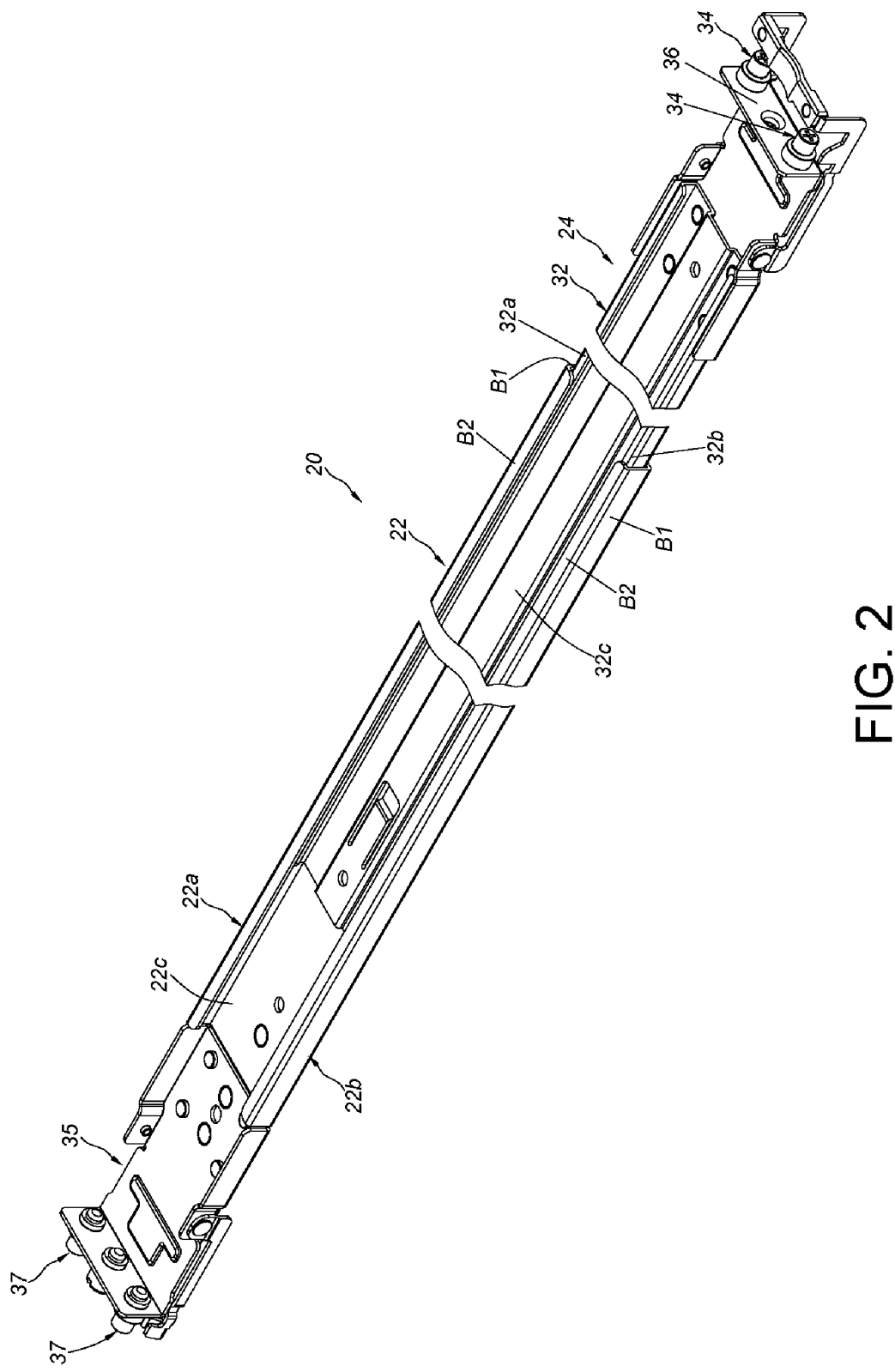
FIG. 2 is a three-dimensional diagram showing the telescopic mechanism in another view angle according to the embodiment of the present invention.
Figure 3:
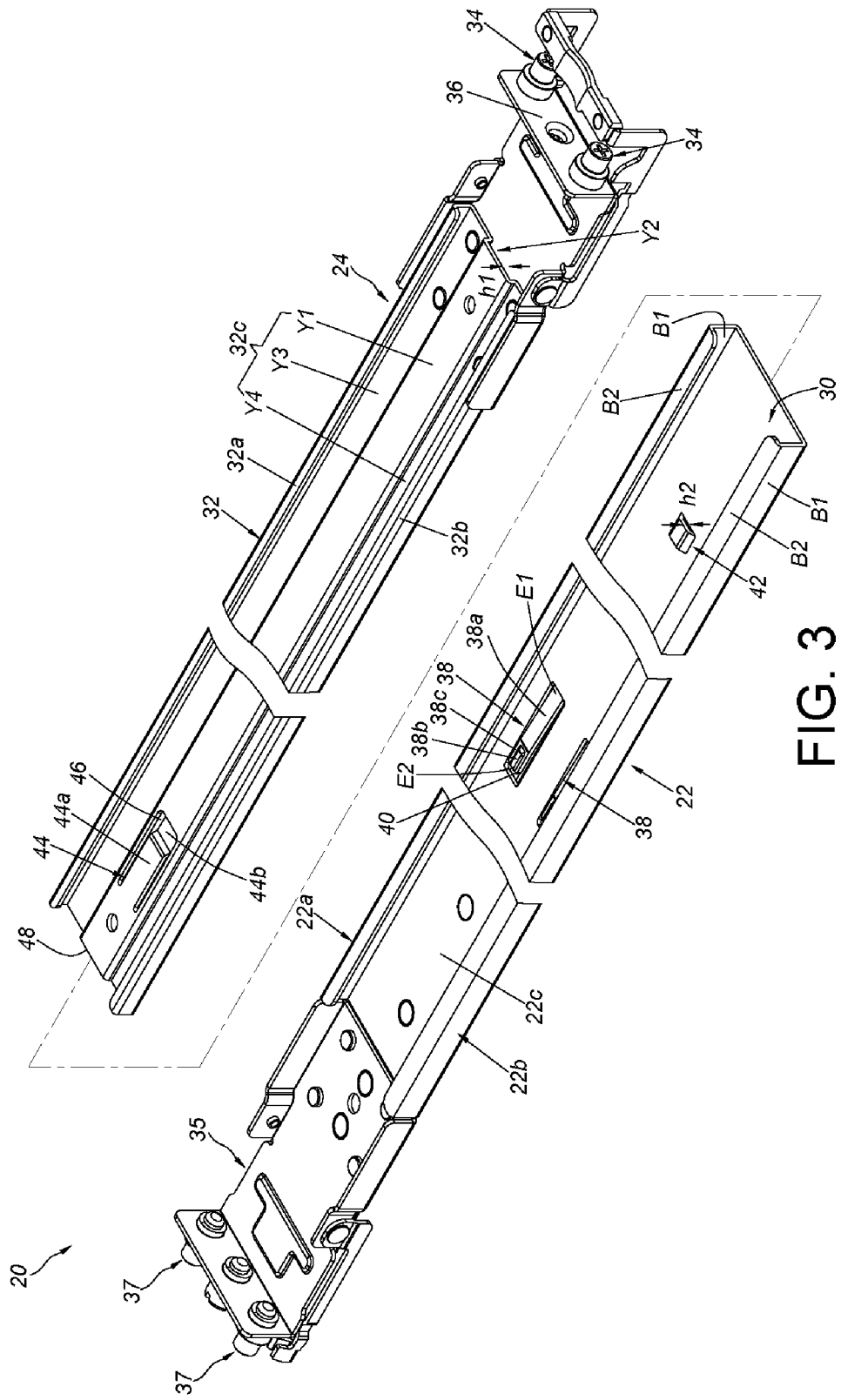
FIG. 3 is an exploded diagram showing the telescopic mechanism according to the embodiment of the present invention.

As shown in FIG. 1, FIG. 2 and FIG. 3, the telescopic mechanism 20 according to the present invention includes a first component and a second component capable of moving relative to the first component along a longitudinal direction. Preferably, the second component is telescopically connected to the first component. In the embodiment, the first component is a reinforcement frame 22, and the second component is a bracket 24, which is only exemplary and the present invention is not limited thereto. The telescopic mechanism 20 can further include a rail member 26 and a movable rail 28 (shown in FIG.

Preferably, the rail member 26 has a first side S1 and a second side S2 opposite to the first side S1. The reinforcement frame 22 is connected to (such as fixed to) the first side S1 of the rail member 26. Therefore, the reinforcement frame 22 can be regarded as a portion of the rail member 26. The movable rail 28 can be arranged on the second side S2 of the rail member 26. For example, the second side S2 of the rail member 26 has a longitudinal passage for accommodating the movable rail 28, such that the movable rail 28 is capable of moving relative to the rail member 26 along the longitudinal direction through the longitudinal passage.

As shown in FIG. 2 and FIG. 3, the reinforcement frame 22 includes a first wall 22a, a second wall 22b and a longitudinal wall 22c connected between the first wall 22a and the second wall 22b. A passage 30 is defined by the first wall 22a, the second wall 22b and the longitudinal wall 22c. The bracket 24 includes an extending wall 32 and at least one mounting element 34. The extending wall 32 of the bracket 24 is mounted in the passage 30 of the reinforcement frame 22, and the at least one mounting element 34 of the bracket 24 is located outside the passage 30 of the reinforcement frame 22. The at least one mounting element 34 of the bracket 24 is configured to mount the telescopic mechanism 20 to a first post of a rack. Preferably, the telescopic mechanism 20 further includes another bracket 35. As shown in FIG. 1, the bracket 24 and the another bracket 35 are arranged adjacent to a first end portion 26a and a second end portion 26b of the rail member 26, respectively. Specifically, the extending wall 32 of the bracket 24 is disposed in the passage 30 of the reinforcement frame 22. The another bracket 35 is connected to an end of the reinforcement frame 22. The another bracket 35 includes at least one mounting element 37 configured to mount the telescopic mechanism 20 to a second post of the rack.

Preferably, the at least one mounting element 34 is arranged at an end portion adjacent to the extending wall 32. Herein, the end portion is arranged with an end wall 36 substantially perpendicularly connected to the extending wall 32, and the at least one mounting element 34 is arranged on the end wall 36, which is only exemplary and the present invention is not limited thereto.

Preferably, at least one of the first wall 22a and the second wall 22b of the reinforcement frame 22 has a first section B1 and a second section B2. The first section B1 is bent relative to the longitudinal wall 22c of the reinforcement frame 22. The second section B2 is bent relative to the first section B1. In the embodiment, both of the first wall 22a and the second wall 22b of the reinforcement frame 22 have the first section B1 and the second section B2, which is only exemplary and the present invention is not limited thereto. The extending wall 32 of the bracket 24 includes a first portion 32a, a second portion 32b and an extending portion 32c connected between the first portion 32a and the second portion 32b. The second section B2 of the first wall 22a of the reinforcement frame 22 supports the first portion 32a of the extending wall 32 of the bracket 24. The second section B2 of the second wall 22b of the reinforcement frame 22 supports the second portion 32b of the extending wall 32 of the bracket 24. In other embodiment, only the first wall 22a of the reinforcement frame 22 has the first section B1 and the second section B2, and the second section B2 of the first wall 22a of the reinforcement frame 22 supports the first portion 32a of the extending wall 32 of the bracket 24. Alternatively, only the second wall 22b of the reinforcement frame 22 has the first section B1 and the second section B2, and the second section B2 of the second wall 22b of the reinforcement frame 22 supports the second portion 32b of the extending wall 32 of the bracket 24.

As shown in FIG. 3, the bracket 24 is detachably mounted to the reinforcement frame 22. One of the reinforcement frame 22 and the bracket 24 is arranged with at least one contacting portion 38. Herein, the reinforcement frame 22 is arranged with two contacting portions 38, but an amount of the contacting portion 38 of the present invention is not limited thereto. Each of the contacting portions 38 is arranged at the longitudinal wall 22c of the reinforcement frame 22 and is arranged in the passage 30. In the embodiment, the number of the contacting portions 38 is illustrated for exemplary. In other embodiment, the reinforcement frame 22 can be arranged with only one contacting portion 38. That is, structure of the reinforcement frame 22 being arranged with at least one contacting portion 38 is within the scope of the present invention. Further, in the embodiment, the position of the contacting portion 38 is illustrated for exemplary. In other embodiment, the contacting portion 38 can be arranged at the first wall 22a or the second wall 22b of the reinforcement frame 22. That is, structure of the contacting portion 38 being arranged on at least one of the first wall 22a, the second wall 22b and the longitudinal wall 22c of the reinforcement frame 22 is within the scope of the present invention.

Specifically, the contacting portion 38 can include an elastic section 38a and a contacting section 38b. The elastic section 38a has a first end E1 and a second end E2. The first end E1 is connected to one of the first wall 22a, the second wall 22b and the longitudinal wall 22c of the reinforcement frames 22. Preferably, the reinforcement frame 22 is formed with a first hole 40, and a position of the contacting portion 38 is corresponding to that of the first hole 40. An extending direction of the first hole 40 can be parallel to the longitudinal direction. An extending direction of the contacting portion 38 can be parallel to the longitudinal direction. In the embodiment, the first end E1 of the elastic section 38a of the contacting portion 38 is connected to the longitudinal wall 22c of the reinforcement frame 22, which is only exemplary. The longitudinal wall 22c of the reinforcement frame 22 is formed with the first hole 40, and the position of the contacting portion 38 is corresponding to that of the first hole 40. The contacting section 38b is located between the first end E1 and the second end E2. In other embodiment, the first hole 40 can be formed on the first wall 22a, and the contacting portion 38 is also disposed at the first wall 22a. Alternatively, the first hole 40 can be formed on the second wall 22b, and the contacting portion 38 is also disposed at the second wall 22b.

Specifically, the contacting portion 38 can be disposed in the first hole 40. The first end E1 of the elastic section 38a is connected to a hole wall of the first hole 40, such that the contacting portion 38 can swing in the first hole 40. More specifically, the contacting portion 38 can swing along a direction perpendicular to the longitudinal direction. The contacting section 38b can be disposed on the elastic section 38a. Specifically, the contacting section 38b is disposed on a surface 38c of the elastic section 38a facing toward the bracket 24. The contacting section 38b is protruded from the surface 38c of the elastic section 38a.

In other embodiment (not shown), the contacting portion 38 can be disposed on the bracket 24. For example, the bracket 24 can be arranged with at least one contacting portion 38. The bracket 24 can have at least one of the first portion 32a, the second portion 32b and the extending portion 32c arranged with the contacting portion 38. The contacting portion 38 can include the elastic section 38a and the contacting section 38b. The elastic section 38a includes the first end E1 and the second end E2. The first end E1 is connected to one of the first portion 32a, the second portion 32b and the extending portion 32c. Preferably, the bracket 24 can be formed with the first hole 40. The position of the contacting portion 38 is corresponding to the first hole 40. Specifically, the contacting portion 38 can be disposed in the first hole 40. The first end E1 of the elastic section 38a is connected to a hole wall of the first hole 40, such that the contacting portion 38 can swing in the first hole 40. The contacting section 38b is disposed between the first end E1 and the second end E2. The contacting section 38b can be disposed on the elastic section 38a. Specifically, the contacting section 38b is disposed on the surface 38c of the elastic section 38a facing toward the reinforcement frame 22. The contacting section 38b is protruded from the surface 38c of the elastic section 38a.

Preferably, the reinforcement frame 22 is arranged with a first limiting feature 42, the bracket 24 is arranged with a second limiting feature 44, and the first limiting feature 42 and the second limiting feature 44 are cooperated with each other. In the embodiment, the first limiting feature 42 is a protrusion, and the second limiting feature 44 is a flexible arm, which is only exemplary and the present invention is not limited thereto. For example, in other embodiment, the first limiting feature 42 can be the flexible arm, and the second limiting feature 44 can be the protrusion. In the embodiment, the first limiting feature 42 (the protrusion) is arranged on the longitudinal wall 22c of the reinforcement frame 22, and the second limiting feature 44 (the flexible arm) is arranged at the extending portion 32c of the extending wall 32 of the bracket 24. The second limiting feature 44 includes a flexible section 44a and an abutting section 44b. The flexible section 44a is connected to the extending portion 32c of the bracket 24. The abutting section 44b is connected to the flexible section 44a and is bent relative to the flexible section 44a. Specifically, the abutting section 44b is bent toward the reinforcement frame 22. Preferably, the extending portion 32c of the bracket 24 is formed with a second hole 46, and a position of the second limiting feature 44 is corresponding to the second hole 46. An extending direction of the second hole 46 can be parallel to the longitudinal direction. An extending direction of the second limiting feature 44 can be parallel to the longitudinal direction. Specifically, the second limiting feature 44 can be disposed in the second hole 46. An end of the flexible section 44a is connected to a hole wall of the second hole 46, and another end of the flexible section 44a is connected to the abutting section 44b, such the second limiting feature 44 can swing in the second hole 46, and the second limiting feature 44 can swing along the direction perpendicular to the longitudinal direction.

Figure 4:
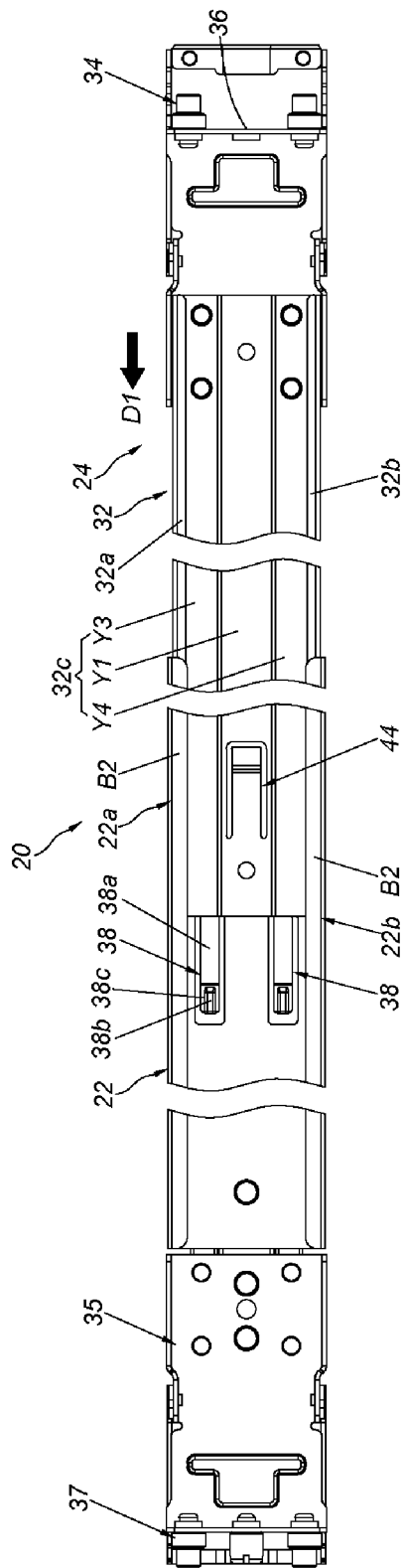
FIG. 4 is a diagram showing the second component of the telescopic mechanism being mounted to the first component of the telescopic mechanism along a first direction according to the embodiment of the present invention.

As shown in FIG. 3 and FIG. 4, when the bracket 24 is desired to be mounted to the reinforcement frame 22, a user can move the extending wall 32 of the bracket 24 toward the passage 30 of the reinforcement frame 22 along a first direction D1. Alternatively, the user can move the passage 30 of the reinforcement frame 22 toward the extending wall 32 of the bracket 24 along a second direction D2 opposite to the first direction D1. As such, the bracket 24 and the reinforcement frame 22 can be mounted with each other. In the embodiment, the extending wall 32 of the bracket 24 is moved toward the passage 30 of the reinforcement frame 22 along the first direction D1 so as to mount the bracket 24 to the reinforcement frame 22. Furthermore, a portion of the extending portion 32c of the bracket 24 and the first limiting feature 42 (the protrusion) are arranged to dodge with each other. Therefore, when the bracket 24 is mounted to the passage 30 of the reinforcement frame 22 along the first direction D1, the bracket 24 does not interfere with the reinforcement frame 22. In the embodiment, the extending portion 32c includes a U-shaped structure Y1, a first connecting portion Y3 and a second connecting portion Y4. The first connecting portion Y3 is connected between the first portion 32a and a side of the U-shaped structure Y1. The second connecting portion Y4 is connected between the second portion 32b and another side of the U-shaped structure Y1. The U-shaped structure Y1 is disposed between the first connecting portion Y3 and the second connecting portion Y4. The U-shaped structure Y1 is bent relative to the first connecting portion Y3 and the second connecting portion Y4, so as to forma dodging space Y2 below the U-shaped structure Y1. A height h1 of the dodging space Y2 is greater than a height h2 of the first limiting feature 42. As shown in FIG. 4, the second limiting feature 44 is disposed at the U-shaped structure Y1, and the flexible section 44a is closer to the end portion 48 than the abutting section 44b. When the extending wall 32 of the bracket 24 is mounted in the passage 30 of the reinforcement frame 22 along the first direction, the flexible section 44a is first mounted into the passage 30, then the abutting section 44b is mounted into the passage 30. Furthermore, the two contacting portions 38 are corresponding to the first connecting portion Y3 and the second connecting portion Y4, respectively.

Figure 5:
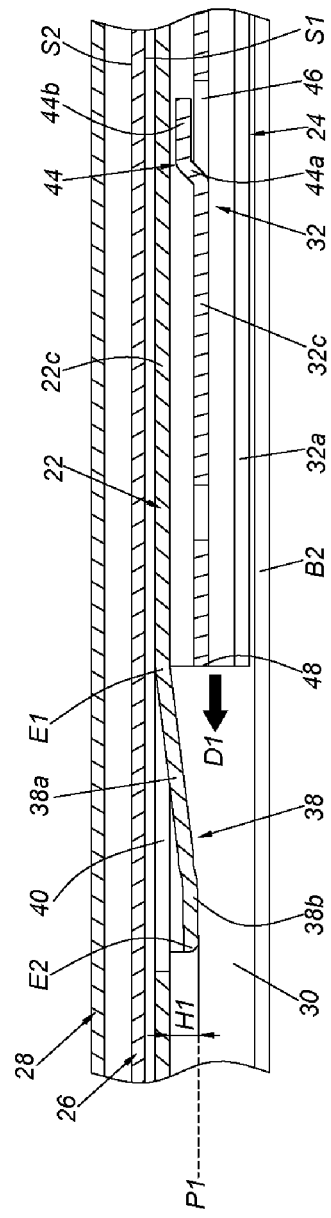
FIG. 5 is a partial cross-sectional view showing the second component of the telescopic mechanism being mounted to the first component of the telescopic mechanism along the first direction according to the embodiment of the present invention.

As shown in FIG. 5, the contacting portion 38 is in a first state P1 via the elastic section 38a. The first end E1 of the elastic section 38a of the contacting portion 38 is connected to the longitudinal wall 22c of the reinforcement frame 22, and a first height H1 along a transverse direction (or a lateral direction) is defined between the contacting section 38b of the contacting portion 38 and the longitudinal wall 22c of the reinforcement frame 22. That is, the contacting section 38b of the contacting portion 38 has the first height H1 relative to the longitudinal wall 22c of the reinforcement frame 22. During a process of mounting the extending wall 32 of the bracket 24 in the passage 30 of the reinforcement frame 22 along the first direction D1, a portion of the bracket 24 (such as the end portion 48) is moved toward the elastic section 38a of the contacting portion 38.

Figure 6:
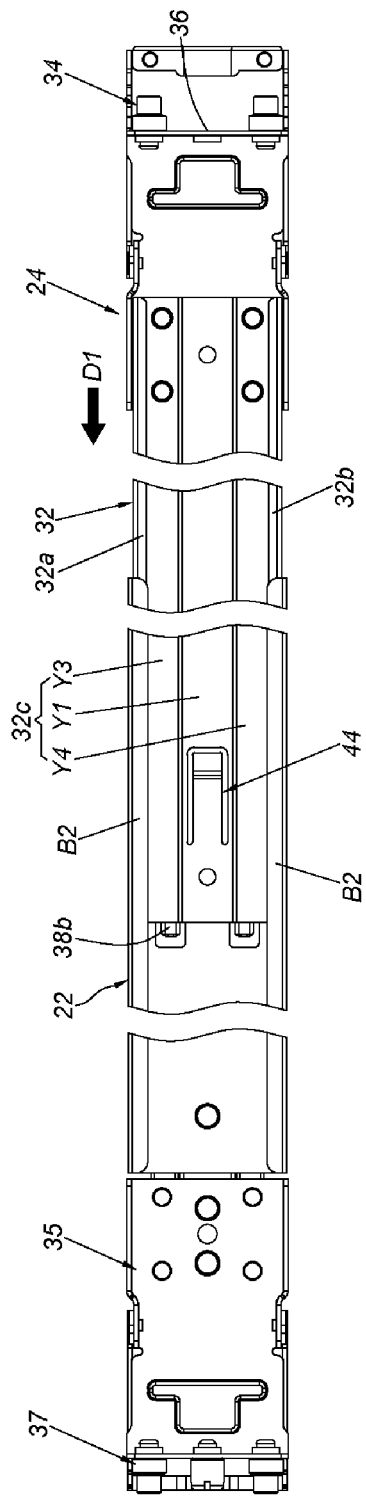
FIG. 6 is a diagram showing the second component of the telescopic mechanism continued to be mounted to the first component of the telescopic mechanism along the first direction according to the embodiment of the present invention.
Figure 7:
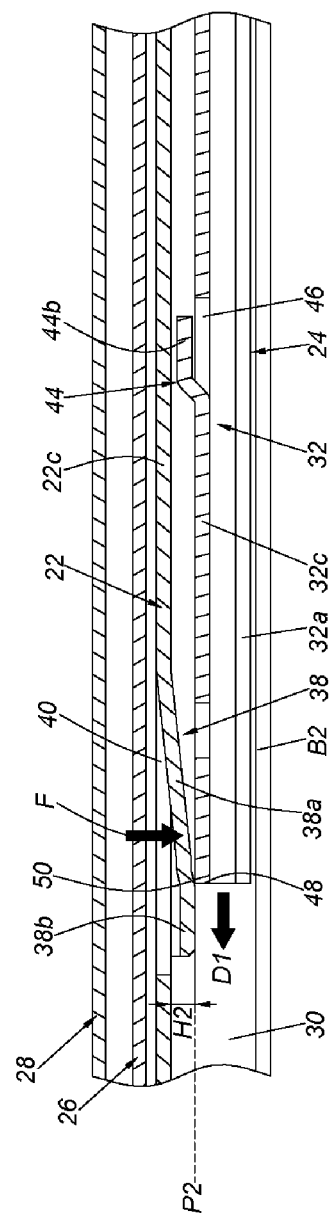
FIG. 7 is a partial cross-sectional view showing the second component of the telescopic mechanism continued to be mounted to the first component of the telescopic mechanism along the first direction according to the embodiment of the present invention.

As shown in FIG. 6 and FIG. 7, when the bracket 24 is continued to be mounted to the reinforcement frame 22 along the first direction D1, the portion of the bracket 24 (such as the end portion 48) abuts against the elastic section 38a (or the contacting section 38b) of the contacting portion 38 to bring the contacting portion 38 to change to a second state P2 from the first state P1, such that the first height H1 is reduced to a second height H2. Specifically, the bracket 24 presses the elastic section 38a of the contacting portion 38, such that elastic section 38a of the contacting portion 38 accumulates an elastic force F, and the elastic force F is toward the bracket 24. Accordingly, the contacting portion 38 is capable of resiliently abutting the extending portion 32c of the extending wall 32 of the bracket 24. More specifically, the contacting portions 38 resiliently abut the first connecting portion Y3 and the second connecting portion Y4 of the extending portion 32c. As such, a friction resistance is generated between the contacting portions 38 and the first connecting portion Y3 and the second connecting portion Y4 of the extending portion 32c, which can ease a force provided by the user applied to the bracket 24 and the reinforcement frame 22 when the bracket 24 and the reinforcement frame 22 are mounted with each other. Preferably, the portion (such as the end portion 48) of the bracket 24 or each of the contacting portions 38 can have a guiding portion 50 (such as an inclined surface and a curved surface), which is favorable for the portion (such as the end portion 48) the bracket 24 bringing the contacting portions 38 to change the second state P2 from the first state P1.

As shown in FIG. 8 to FIG. 11, when the bracket 24 is further moved along the first direction D1, the extending wall 32 of the bracket 24 can be mounted in the passage 30 of the reinforcement frame 22.

Moreover, when the bracket 24 is mounted to the reinforcement frame 22, the contacting section 38b of the contacting portion 38 is capable of resiliently abutting the extending portion 32c of the extending wall 32 of the bracket 24 through the elastic force F of the elastic section 38a, which can provide a friction resistance to stop the bracket 24 from moving relative to the reinforcement frame 22 along the first direction D1 or the second direction D2 so to provide an anti-slip effect. The extending portion 32c of the extending wall 32 of the bracket 24 presses and abuts against the contacting portion 38, such that the contacting portion 38 is kept at the second state P2, and the second section B2 of one of the first wall 22a and the second wall 22b of the reinforcement frame 22 supports or abuts against the first portion 32a or the second portion 32b of the extending wall 32 of the bracket 24.

Preferably, due to the friction resistance (such as the elastic force F of the contacting portion 38 applied to the reinforcement frame 22), when the user does not apply a force to the bracket 24, the bracket 24 is not allowed to move relative to the reinforcement frame 22 from a first position X1 along the first direction D1 or the second direction D2. That is, the bracket 24 is stopped from moving relative to the reinforcement frame 22 from the first position X1 along the first direction D1 or the second direction D2 by the friction resistance. When the bracket 24 is at the first position X relative to the reinforcement frame 22, a predetermined distance along the longitudinal direction is between the second limiting feature 44 and the first limiting feature 42.

Preferably, when a force greater than the friction resistance (such as the elastic force F of the contacting portion 38 applied to the reinforcement frame 22) is applied to the bracket 24, the bracket 24 is allowed to move relative to the reinforcement frame 22 from the first position X1 along the first direction D1 or the second direction D2 opposite to the first direction D1. For example, as shown in FIG. 12 and FIG. 13, only when the user applies a force K to the bracket 24 along the second direction D2 and the force K is greater than the friction resistance, the bracket 24 is allowed to be moved from the first position X1 to a second position X2 along the second direction D2. When the bracket 24 is at the second position X2 relative to the reinforcement frame 22, the second limiting feature 44 and the first limiting feature 42 are abutted with each other, such that the bracket 24 is prevented from moving along the second direction D2 and detaching from the passage 30 of the reinforcement frame 22.

Furthermore, when the bracket 24 is desired to be detached from the passage 30 of the reinforcement frame 22 along the second direction D2, the user can pull the flexible section 44a of the second limiting feature 44, such that the abutting section 44b can be moved over the first limiting feature 42. As such, the bracket 24 can be detached from the passage 30 of the reinforcement frame 22 along the second direction D2.

According to above description, the bracket 24 is allowed to be moved relative to the reinforcement frame 22 from the first position X1 along the first direction D1 or the second direction D2 only when the force K applied to the bracket 24 is greater than the friction resistance. In other words, when the force K applied to the bracket 24 is smaller than the friction resistance, the bracket 24 is allowed to be moved relative to the reinforcement frame 22 from the first position X1. As such, it can prevent the bracket 24 and the reinforcement frame 22 from arbitrarily moving relative to each other due to a force (such as the gravity) and the angle at which the user picks up the telescopic mechanism 20 (for example, when the user picks up the telescopic mechanism. 20 casually and the telescopic mechanism 20 is not horizontal, a component of the gravity may apply to the bracket 24 and the reinforcement frame 22 along the longitudinal direction). As such, the telescopic mechanism 20 is featured with safety and reliability.

To sum up, the telescopic mechanism 20 according to the embodiment of the present invention includes features as follows.

First, one of the first component (such as the reinforcement frame 22) and the second component (such as the bracket 24) is arranged with a contacting portion 38, and the contacting portion 38 resiliently abuts against the other one of the first component and the second component, such that a friction resistance is provided when the second component is moved relative to the first component, which results in an anti-slip effect. As such, the second component and the first component can be prevented from arbitrarily moved relative to each other due to pick-up angle and the gravity, and the telescopic mechanism 20 is featured with safety and reliability.

Second, one of the first component (such as the reinforcement frame 22) and the second component (such as the bracket 24) is arranged with a contacting portion 38. When the first component and the second component are mounted with each other, a force provided by the user applied to the bracket 24 and the reinforcement frame 22 can be eased through the friction resistance provided by the contacting portion 38.

In the present invention, the phrase "longitudinal direction" refers a direction parallel to an extending direction of the first component, or a direction parallel to an extending direction of the second component. The phrase "transverse direction" (or "lateral direction") refers a direction perpendicular to the extending direction of the first component, or a direction perpendicular to the extending direction of the second component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A telescopic mechanism, comprising:
  a first component; and
  a second component capable of moving relative to the first component along a longitudinal direction;
  wherein one of the first component and the second component is arranged with a contacting portion, and the contacting portion is configured to resiliently abut against the other one of the first component and the second component, such that a friction resistance is provided when the second component is moved relative to the first component;
  wherein the contacting portion comprises an elastic section and a contacting section disposed on a surface of the elastic section, the elastic section tilts toward the other one of the first component and the second component;
  wherein when the contacting portion is in a first state, the other one of the first component and the second component does not abut against the contacting portion, and a first height is defined between the contacting section and a wall of the one of the first component and the second component;
  wherein when the second component is moved relative to the first component to make a portion of the other one of the first component and the second component abut against the elastic section of the contacting portion to bring the contacting portion to change to a second state from the first state, a second height is defined between the contacting section and the wall of the one of the first component and the second component, and the first height is greater than the second height;
  wherein the first component is arranged with a first limiting feature, the second component is arranged with a second limiting feature, and the first limiting feature and the second limiting feature are cooperated with each other.

2. The telescopic mechanism of claim 1, wherein the first component is a reinforcement frame, the reinforcement frame comprises a first wall, a second wall and a longitudinal wall connected between the first wall and the second wall, a passage is defined by the first wall, the second wall and the longitudinal wall, the second component is a bracket, the bracket comprises an extending wall and at least one mounting element, the extending wall of the bracket is mounted in the passage of the reinforcement frame, and the at least one mounting element of the bracket is located outside the passage of the reinforcement frame.

3. The telescopic mechanism of claim 2, wherein the at least one mounting element is arranged at an end portion adjacent to the extending wall.

4. The telescopic mechanism of claim 2, wherein one of the first wall and the second wall of the reinforcement frame has a first section and a second section, the second section is bent relative to the first section, the extending wall of the bracket comprises a first portion, a second portion and an extending portion connected between the first portion and the second portion, the extending portion of the extending wall of the bracket is abutted against the contacting portion when the contacting portion is in the second state, and the second section of the one of the first wall and the second wall of the reinforcement frame supports one of the first portion and the second portion of the extending wall of the bracket.

5. The telescopic mechanism of claim 2, further comprising:
  a rail member having a first side and a second side opposite to the first side, the reinforcement frame being connected to the first side of the rail member;
  a movable rail arranged on the second side of the rail member, the movable rail capable of moving relative to the rail member along the longitudinal direction; and
  another bracket, wherein the bracket and the another bracket are respectively arranged adjacent to a first end portion and a second end portion of the rail member.

6. The telescopic mechanism of claim 2, wherein the contacting portion is arranged in the passage of the reinforcement frame.

7. The telescopic mechanism of claim 6, wherein the elastic section has a first end and a second end, the first end is connected to one of the first wall, the second wall and the longitudinal wall of the reinforcement frame, the contacting section is located between the first end and the second end, the contacting section is configured to abut the bracket.

8. The telescopic mechanism of claim 7, wherein the first end of the elastic section of the contacting portion is connected to the longitudinal wall of the reinforcement frame, and the first height and the second height are defined between the contacting section of the contacting portion and the longitudinal wall of the reinforcement frame.

9. The telescopic mechanism of claim 1, wherein the friction resistance is provided to stop the second component from moving relative to the first component from a position along a first direction or a second direction opposite to the first direction.

10. The telescopic mechanism of claim 1, wherein when a force greater than the friction resistance is applied to the second component, the second component is allowed to move relative to the first component from a position along a first direction or a second direction opposite to the first direction.

11. A telescopic mechanism, comprising:
a first component; and
a second component telescopically connected to the first component;
wherein one of the first component and the second component is arranged with a contacting portion, and the contacting portion is configured to resiliently abut against the other one of the first component and the second component;
wherein the contacting portion comprises an elastic section and a contacting section disposed on a surface of the elastic section, the elastic section tilts toward the other one of the first component and the second component;
wherein when the contacting portion is in a first state, the other one of the first component and the second component does not abut against the contacting portion, and a first height is defined between the contacting section and a wall of the one of the first component and the second component;
wherein when the second component is moved relative to the first component to make a portion of the other one of the first component and the second component abut against the elastic section of the contacting portion to bring the contacting portion to change to a second state from the first state, a second height is defined between the contacting section and the wall of the one of the first component and the second component, and the first height is greater than the second height;
wherein the first component is arranged with a first limiting feature, the second component is arranged with a second limiting feature, and the first limiting feature and the second limiting feature are cooperated with each other.

12. The telescopic mechanism of claim 11, wherein the first component comprises a first wall, a second wall and a longitudinal wall connected between the first wall and the second wall, a passage is defined by the first wall, the second wall and the longitudinal wall, the second component comprises an extending wall and at least one mounting element, the extending wall of the second component is mounted in the passage of the first component, and the at least one mounting element of the second component is located outside the passage of the first component.

13. The telescopic mechanism of claim 12, further comprising:
a rail member, the first component being connected to the rail member.

14. The telescopic mechanism of claim 12, wherein the contacting portion is arranged in the passage of the first component, the elastic section has a first end and a second end, the first end is connected to one of the first wall, the second wall and the longitudinal wall of the first component, the contacting section is located between the first end and the second end, and the contacting section is configured to abut the second component.

15. The telescopic mechanism of claim 14, wherein the first end of the elastic section of the contacting portion is connected to the longitudinal wall of the first component, and the contacting section of the contacting portion has the first height or the second height relative to the longitudinal wall of the first component.

16. A telescopic mechanism, comprising:
a reinforcement frame comprising a first wall, a second wall and a longitudinal wall connected between the first wall and the second wall, a passage being defined by the first wall, the second wall and the longitudinal wall; and
a bracket detachably mounted to the reinforcement frame, the bracket comprising an extending wall and at least one mounting element;
wherein one of the reinforcement frame and the bracket is arranged with a contacting portion, the contacting portion comprises an elastic section and a contacting section disposed on a surface of the elastic section, the elastic section tilts toward the other one of the reinforcement frame and the bracket;
wherein during a process of mounting the extending wall of the bracket in the passage of the reinforcement frame along a first direction, the contacting portion is capable of abutting the other one of the reinforcement frame and the bracket through the elastic section so as to generate a friction resistance;
wherein when the extending wall of the bracket is mounted in the passage of the reinforcement frame, the at least one mounting element is located outside the passage of the reinforcement frame;
wherein when the contacting portion is in a first state, the other one of the reinforcement frame and the bracket does not abut against the contacting portion, and a first height is defined between the contacting section and a wall of the one of the reinforcement frame and the bracket;
wherein when the bracket is moved relative to the reinforcement frame to make a portion of the other one of the reinforcement frame and the bracket abut against the elastic section of the contacting portion to bring the contacting portion to change to a second state from the first state, a second height is defined between the contacting section and the wall of the one of the reinforcement frame and the bracket, and the first height is greater than the second height;
wherein the reinforcement frame is arranged with a first limiting feature, the bracket is arranged with a second limiting feature, the first limiting feature and the second limiting feature are cooperated with each other, when the extending wall of the bracket is mounted in the passage of the reinforcement frame, and the bracket is moved along a second direction opposite to the first direction from a first position to a second position, the first limiting feature and the second limiting feature are abutted with each other, such that the bracket is prevented from moving along the second direction and detaching from the passage of the reinforcement frame.

17. A telescopic mechanism, comprising:
a first component; and
a second component capable of moving relative to the first component along a longitudinal direction;
wherein one of the first component and the second component is arranged with a contacting portion, and the contacting portion is configured to resiliently abut against the other one of the first component and the second component, such that a friction resistance is provided when the second component is moved relative to the first component;
wherein the contacting portion comprises an elastic section and a contacting section disposed on a surface of the elastic section, the elastic section tilts toward the other one of the first component and the second component;
wherein when the contacting portion is in a first state, the other one of the first component and the second component does not abut against the contacting portion, and a first height is defined between the contacting section and a wall of the one of the first component and the second component;
wherein when the second component is moved relative to the first component to make a portion of the other one of the first component and the second component abut against the elastic section of the contacting portion to bring the contacting portion to change to a second state from the first state, a second height is defined between the contacting section and the wall of the one of the first component and the second component, and the first height is greater than the second height;
wherein the first component is a reinforcement frame, the reinforcement frame comprises a first wall, a second wall and a longitudinal wall connected between the first wall and the second wall, a passage is defined by the first wall, the second wall and the longitudinal wall, the second component is a bracket, the bracket comprises an extending wall and at least one mounting element, the extending wall of the bracket is mounted in the passage of the reinforcement frame, and the at least one mounting element of the bracket is located outside the passage of the reinforcement frame;
wherein the telescopic mechanism further comprises a rail member and a movable rail, the rail member has a first side and a second side opposite to the first side, the reinforcement frame is connected to the first side of the rail member, the movable rail is arranged on the second side of the rail member, the movable rail is capable of moving relative to the rail member along the longitudinal direction.

* * * * *